United States Patent
Mita et al.

(10) Patent No.: US 11,277,547 B2
(45) Date of Patent: Mar. 15, 2022

(54) CAMERA SYSTEM AND MOBILE BODY

(71) Applicant: SZ DJI TECHNOLOGY CO., LTD., Shenzhen (CN)

(72) Inventors: Hideaki Mita, Shenzhen (CN); Yuji Wada, Shenzhen (CN); Atsushi Mikoshiba, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/087,175

(22) Filed: Nov. 2, 2020

(65) Prior Publication Data

US 2021/0051256 A1   Feb. 18, 2021

Related U.S. Application Data

(63) Continuation of application No. PCT/CN2019/087420, filed on May 17, 2019.

(30) Foreign Application Priority Data

May 21, 2018   (JP) .............................. JP2018-097458

(51) Int. Cl.
*H04N 5/225* (2006.01)
*B64D 47/08* (2006.01)
*G03B 17/56* (2021.01)

(52) U.S. Cl.
CPC ....... *H04N 5/225251* (2018.08); *B64D 47/08* (2013.01); *G03B 17/561* (2013.01); *H04N 5/2252* (2013.01)

(58) Field of Classification Search
CPC ........... H04N 5/225251; H04N 5/2252; B64D 47/08; G03B 17/561
See application file for complete search history.

(56) References Cited

U.S. PATENT DOCUMENTS 6,738,574 B2 * 5/2004 Nishida ................. G03B 15/03
                                                396/155
6,965,400 B1 * 11/2005 Haba .................. H04N 5/23227
                                                348/222.1

(Continued)

FOREIGN PATENT DOCUMENTS

CN       101075073 A     11/2007
CN       201203517 Y      3/2009

(Continued)

OTHER PUBLICATIONS

The World Intellectual Property Organization (WIPO) International Search Report for PCT/CN2019/087420 dated Jul. 31, 2019 5 Pages (including translation).

*Primary Examiner* — Antoinette T Spinks
(74) *Attorney, Agent, or Firm* — Anova Law Group, PLLC

(57) ABSTRACT

A camera system includes a body, a support member, and a camera. The body includes an image processing circuit. The support member is configured to rotatably support the body. The camera is configured to be detachably arranged at the body and includes a holding member and a sensor. The holding member is configured to detachably hold a lens. The sensor is configured to convert an optical image formed by the lens into an electrical signal. The image processing circuit is configured to perform image processing on the electrical signal from the sensor.

15 Claims, 10 Drawing Sheets

(56) References Cited

U.S. PATENT DOCUMENTS

| | | | |
|---|---|---|---|
| 2004/0257453 A1 | 12/2004 | Lee et al. | |
| 2006/0291842 A1 | 12/2006 | Tokiwa et al. | |
| 2012/0314039 A1 | 12/2012 | You et al. | |
| 2013/0141640 A1* | 6/2013 | Kim | G03B 29/00 348/375 |
| 2014/0132809 A1 | 5/2014 | Nakasuji et al. | |
| 2015/0116538 A1 | 4/2015 | Terauchi et al. | |
| 2018/0091707 A1* | 3/2018 | Jannard | H04N 5/225 |

FOREIGN PATENT DOCUMENTS

| | | |
|---|---|---|
| CN | 101631197 A | 1/2010 |
| CN | 102682099 A | 9/2012 |
| CN | 103139454 A | 6/2013 |
| CN | 105609516 A | 5/2016 |
| CN | 106572286 A | 4/2017 |
| JP | 2000092504 A | 3/2000 |
| JP | 2005333494 A | 12/2005 |
| JP | 2008067174 A | 3/2008 |
| JP | 2015062264 A | 4/2015 |
| JP | 2015136128 A | 7/2015 |
| JP | 2015189321 A | 11/2015 |
| KR | 1020120135751 A | 12/2012 |

\* cited by examiner

CAMERA SYSTEM AND MOBILE BODY

CROSS-REFERENCE TO RELATED APPLICATIONS

This application is a continuation of International Application No. PCT/CN2019/087420, filed May 17, 2019, which claims priority to Japanese Application No. 2018-097458, filed May 21, 2018, the entire contents of both of which are incorporated herein by reference.

TECHNICAL FIELD

The present disclosure relates to a camera system and a mobile body.

BACKGROUND

Japanese Patent Application Laid-Open No. 2015-136128 discloses a modular camera system.

SUMMARY

Embodiments of the present disclosure provide a camera system including a body, a support member, and a camera. The body includes an image processing circuit. The support member is configured to rotatably support the body. The camera is configured to be detachably arranged at the body and includes a holding member and a sensor. The holding member is configured to detachably hold a lens. The sensor is configured to convert an optical image formed by the lens into an electrical signal. The image processing circuit is configured to perform image processing on the electrical signal from the sensor.

Embodiments of the present disclosure provide a camera system including a body and a camera. The body includes a determination circuit and an image processing circuit. The camera is configured to be detachably arranged at the body. The camera includes a sensor. The sensor is configured to convert an optical image into an electrical signal. The determination circuit is configured to determine a type of the camera or the sensor. The image processing circuit is configured to perform predetermined image processing corresponding to the type of the camera or the sensor on the electrical signal from the sensor.

Embodiments of the present disclosure provide a mobile body including a camera system. The camera system includes a body, a support member, and a camera. The body includes an image processing circuit. The support member is configured to rotatably support the body. The camera is configured to be detachably arranged at the body. The camera includes a holding member and a sensor. The holding member is configured to detachably hold a lens. The sensor is configured to convert an optical image formed by the lens into an electrical signal. The image processing circuit is configured to perform image processing on the electrical signal from the sensor.

REFERENCE NUMERALS

Figure 1:
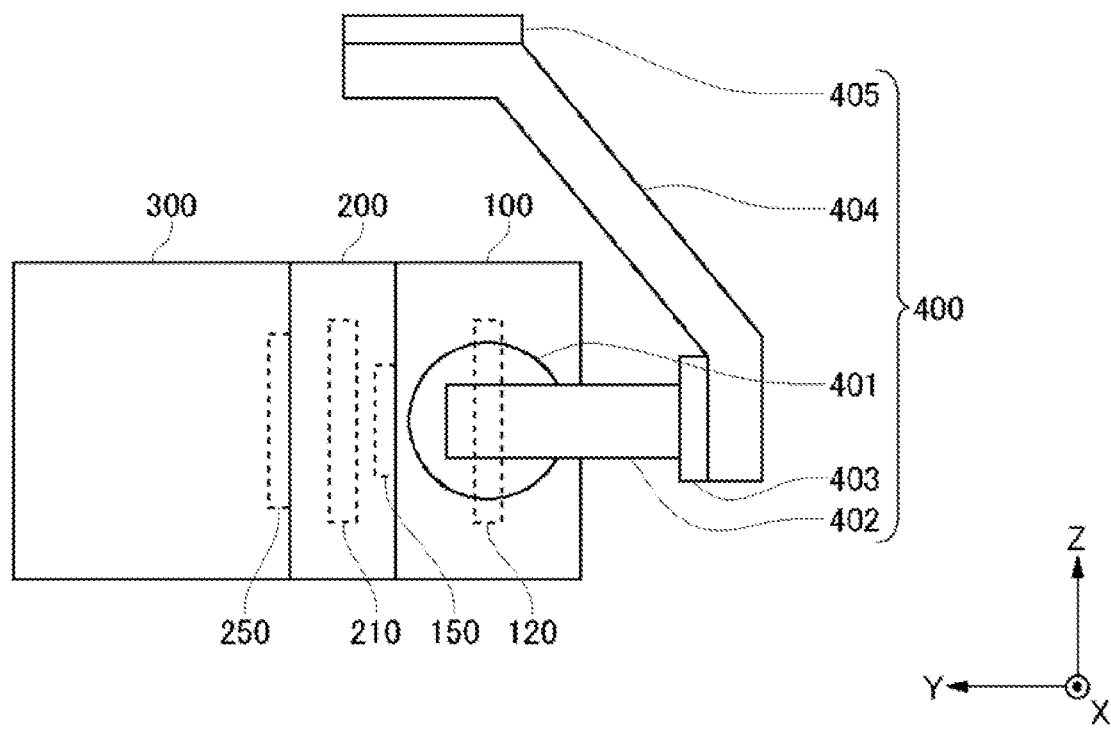
FIG. 1 is a schematic diagram of a camera system according to some embodiments of the present disclosure.

10 UAV
20 UAV body
60 Camera
100 Body
110 Body controller
112 Determination circuit
120 Image processing circuit
122 Synthesis processing circuit
124 Switching circuit
126 Demosaicing circuit
130 Storage device
150 Holding member
102 Camera unit
210 Sensor
212 Pixel array
214 Vertical selection circuit
215 Pixel drive line
216 Horizontal selection circuit
218 Column processing circuit
219 Vertical signal line
220 Camera controller
230 Storage device
250 Holding member
300 Lens unit
310 Lens controller
312 Lens driver
314 Lens
130 Storage device
400 Support assembly
401 First rotation member
402 First support member
403 Second rotation member
404 Second support member
405 Third rotation member
410 Support controller
500 Camera system
600 Remote operation device

DETAILED DESCRIPTION OF THE EMBODIMENTS

Embodiments of the present disclosure are described below. However, the following embodiments of the present disclosure do not limit the invention defined by the claims. Not all combinations of features in embodiments of the present disclosure are necessary for a solution of the present disclosure.

FIG. 1 is a schematic diagram of a camera system 500 according to some embodiments of the present disclosure. The camera system 500 includes a body 100, a camera 200, a lens unit 300, and a support assembly 400.

The support assembly 400 may be configured to rotatably support the body 100. The support assembly 400 may be a gimbal that rotatably supports the body 100 through three mutually orthogonal axes. The support assembly 400 includes a first rotation member 401, a first support member 402, a second rotation member 403, a second support member 404, and a third rotation member 405. The first rotation member 401, the second rotation member 403, and the third rotation member 405 may include actuators. An end of the first support member 402 rotatably supports the body 100 via the first rotation member 401 centered at a first axis (e.g., X-axis: pitch axis). An end of the second support member 404 rotatably supports the first support member 402 via the second rotation member 403 centered at a second axis (e.g., Y-axis: roll axis). The third rotation member 405 is connected to the other end of the second support member 404, such that the second support member 404 may rotate about a third axis (e.g., Z-axis: yaw axis).

The camera 200 may be detachably arranged at the body 100. The body 100 includes a holding member 150, which can detachably hold the camera 200. The holding member 150 may be a connector electrically and mechanically connected to the camera 200. The lens unit 300 may be detachably arranged at the camera 200. The camera 200 includes a holding member 250, which can detachably hold the lens unit 300. The holding member 250 may be a lens snap slot electrically and mechanically connected to the lens unit 300. The camera 200 includes a sensor 210, which can convert an optical image imaged through the lens unit 300 into an electrical signal. The sensor 210 is an image sensor. The image sensor may include a charge-coupled device (CCD) or a complementary metal-oxide-semiconductor (CMOS) device. The body 100 includes an image processing circuit 120 (image processor) that performs image processing on the electrical signal from the sensor 210.

Figure 2:
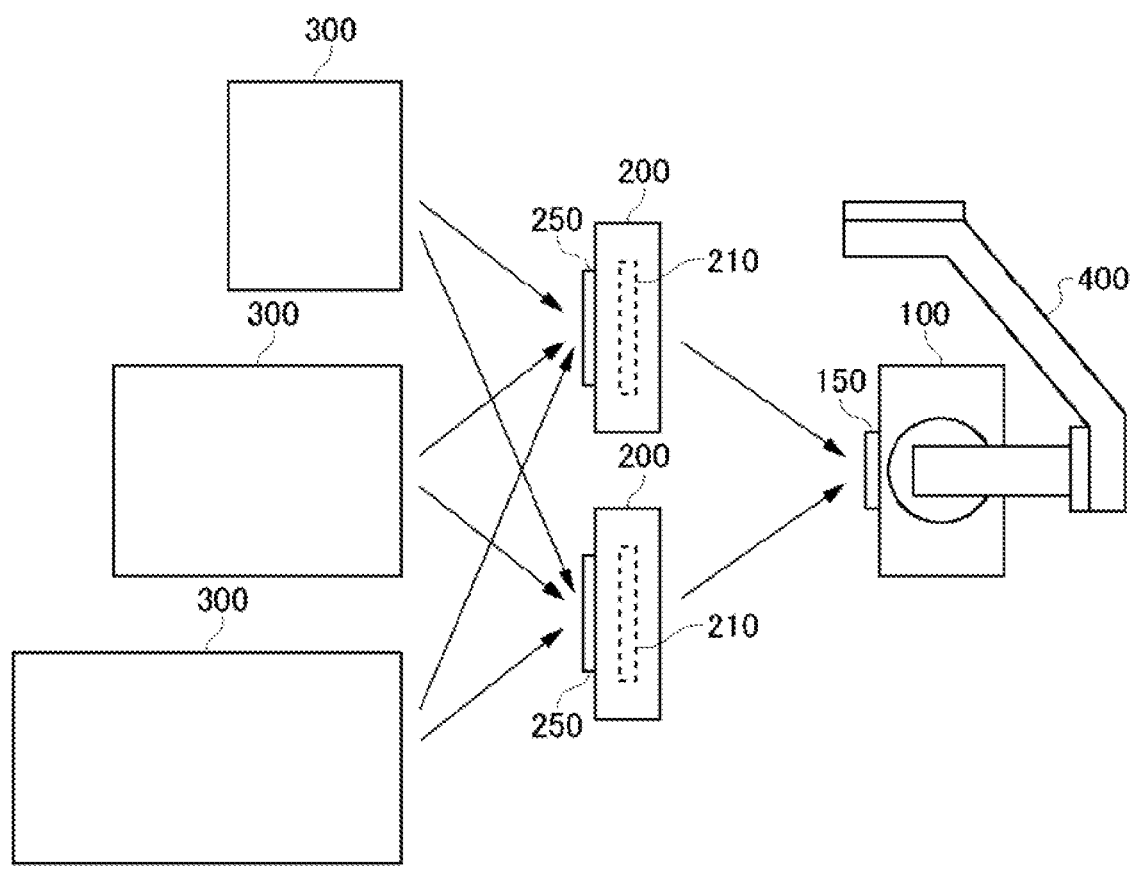
FIG. 2 is a schematic diagram showing an example of the camera system according to some embodiments of the present disclosure.

The camera 200 and the lens unit 300 can be detachably connected to the body 100 of the camera system 500. For example, as shown in FIG. 2, the camera system 500 can be connected to different types of cameras 200 and lens units 300. For example, when a housing integrally formed by the camera 200 and the body 100 is rotatably connected to the support assembly 400, different types of lens units 300 may be connected to the camera 200. However, when the camera 200, the support assembly 400, and the body 100 are formed integrally, to use different types of the cameras 200, for example, the cameras 200 including sensors 210 of different pixels, the support assembly 400 and the body 100 may also need to be changed. In contrast, by also configuring the sensor 210 to be detachable in addition to the lens unit 300, different types of sensors 210 may be swapped conveniently. Since the body 100 includes the image processing circuit 120, the body 100 may share the image processing circuit 120 with the different types of sensors 210. By limiting the function of the sensor 210 to a minimum and arranging a general function at the body 100, the sensor 210 may be provided at a low cost. The body 100 and support assembly 400 may not need to be prepared for each of the different types of sensors 210. Thus, user convenience is improved.

In some embodiments, the support assembly 400 may be designed to support the body 100, such that a gravity center of an object system including the lens unit 300, the camera 200, and the body 100 may be within a preset range starting from the first axis (X-axis). In some other embodiments, the support assembly 400 may be designed to support the body 100, such that the gravity center of the object system including the lens unit 300, the camera 200, and the body 100 may be on the first axis (X-axis). When the weight of the lens unit 300 changes, the gravity center of the object system including the lens unit 300, the camera 200, and the body 100 may shift.

According to the camera system 500 provided by embodiments of the present disclosure, the expensive camera 200 may be shared. By providing the camera 200 individually, the support assembly 400 for supporting the body 100 may be provided at a relatively low cost at a position where the weight of the lens unit 300 is taken into consideration according to the weight of the lens unit 300. The support assembly 400 may support the body 100 to cause the gravity center of the supported object system to be at the first axis (X-axis), such that rotation of the support assembly 400 may be controlled to be power efficient and fast.

Figure 3:
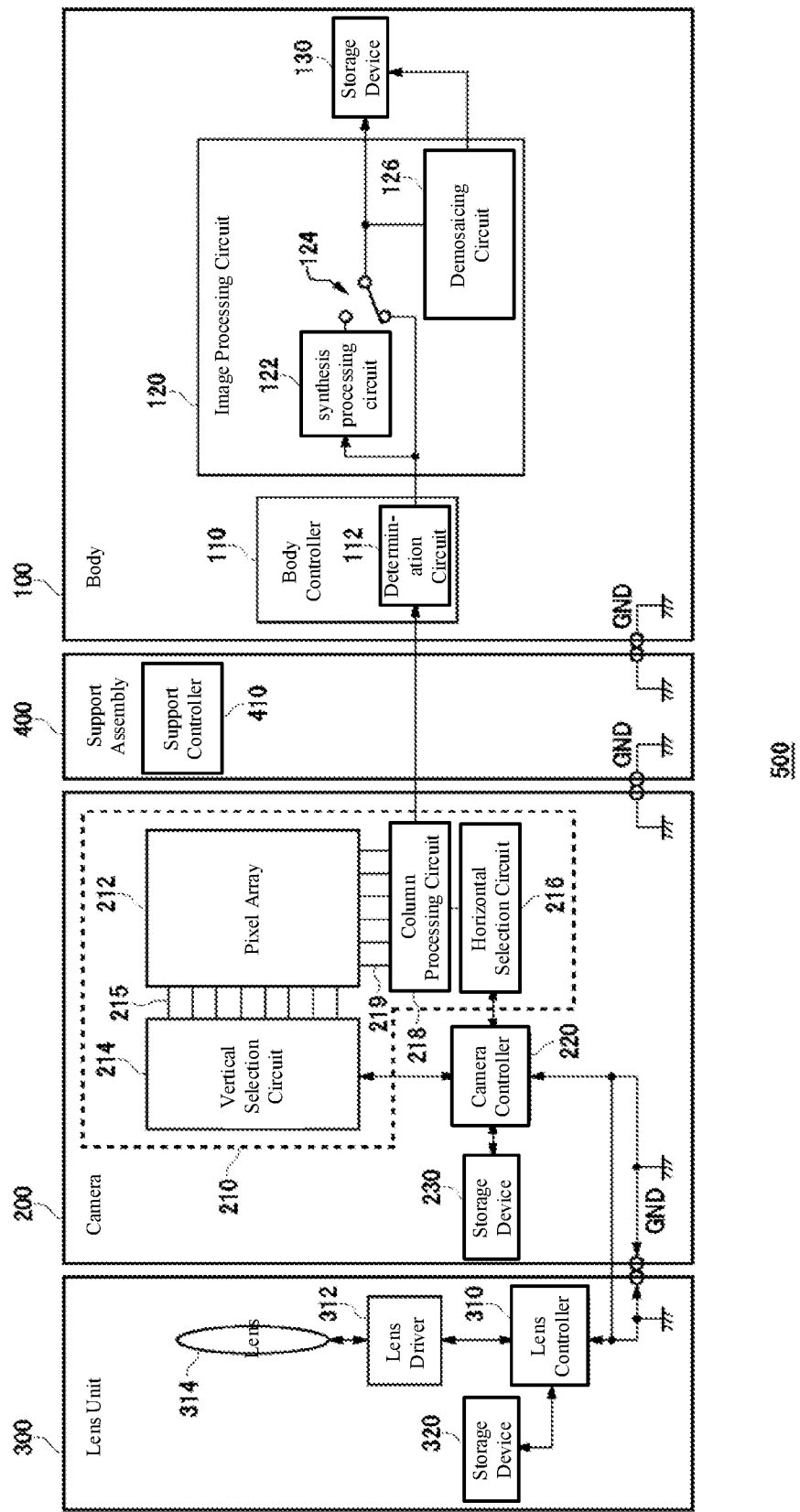
FIG. 3 is a schematic diagram showing functional blocks of the camera system according to some embodiments of the present disclosure.

FIG. 3 shows an example of the functional blocks of the camera system 500. The lens unit 300 includes a lens controller 310, a lens driver 312, a lens 314, and a storage device 320. The lens 314 may function as a zoom lens, a variable focal length lens, or a focus lens. The lens 314 may include a plurality of optical components. The lens 314 may be movably arranged along the optical axis. The lens unit 300 may be an interchangeable lens detachably arranged at the camera 200.

The lens driver 312 may cause the lens 314 to move along the optical axis via a mechanism such as a cam ring, etc. The lens driver 312 may include an actuator. The actuator may include a motor. The lens controller 310 may drive the lens driver 312 according to a lens control instruction from the body 100 and the camera 200 to cause the lens 314 to move along the optical axis via the mechanism. The lens control instruction, for example, may include a zooming control instruction and a focus control instruction. The lens controller 310 may perform at least one of a zooming operation or focusing operation by moving the lens 314 along the optical axis.

The lens unit 300 further includes a storage device 320. The storage device 320 stores a control value of the lens 314 driven by the lens driver 312. The storage device 320 may include at least one flash drive of static random-access memory (SRAM), dynamic random access memory (DRAM), erasable programmable read-only memory (EPROM), electrically erasable programmable read-only memory (EEPROM), universal serial bus (USB) memory, or a solid-state drive (SSD).

The camera 200 includes the sensor 210, the camera controller 220, and the storage device 230. The sensor 210 may convert the optical image imaged via the lens 314 into the electrical signal and output to the body 100. The camera controller 220 may control the sensor 210. The storage device 230 may be a computer-readable storage medium including at least one flash drive of SRAM, DRAM, EPROM, EEPROM, USB memory, or SSD. The storage device 230 may store a program, which is necessary for the camera controller 220 to control the sensor 210. The storage device 230 may store recognition information for recognizing the type of the camera 200 or the sensor 210.

The sensor 210 includes a pixel array 212, a vertical selection circuit 214, a horizontal selection circuit 216, and a column processing circuit 218. The pixel array 212 may include a plurality of pixel, which may be arranged in a predetermined arrangement including a photoelectrical conversion circuit that may generate and accumulate charges corresponding to an amount of received light. The plurality of pixels are arranged two-dimensionally in a row direction (horizontal direction) and a column direction (vertical direction).

The pixel array 212 is connected to the vertical selection circuit 214 through a plurality of pixel drive lines 215 corresponding to the row direction. The pixel drive lines 215 may transmit a drive signal, which may be used for driving when a signal is read from the pixels.

The vertical selection circuit 214 may include a shift register, an address decoder, etc., and drive the pixels of the pixel array 212 with all the pixels simultaneously, in unit of row, etc. The vertical selection circuit 214 and the camera controller 220, which controls the vertical selection circuit 214, form the driver for controlling an operation of the pixels of the pixel array 212.

The vertical selection circuit 214 may perform a read scan and an erase scan. During the read scan, the vertical selection circuit 214 may select sequentially in the unit of row and scan the pixels of the pixel array 212. For a read row on which the read scan is to be performed, during the erase scan, the vertical selection circuit 214 may perform the erase scan ahead of the read scan by an amount of exposure time. The vertical selection circuit 214 may realize the function of an electronic shutter by performing the read scan and the erase scan.

Signals output by the pixels of rows scanned by the vertical selection circuit 214 may be entered into the column processing circuit 218 column by column via the vertical signal line 219. The column processing circuit 218 may perform predetermined signal processing on the columns of the pixel array 212 and the signals output via the vertical signal line 219 from the pixels of the selected rows and output the electrical signals of the pixels.

The column processing circuit 218 may perform noise removal processing, for example, correlated double sampling (CDS) or double data sampling (DDS) may be used as the signal processing. A reset noise may be removed by performing the CDS processing.

The horizontal selection circuit 216 may include the shift register and the address decoder, etc., and select sequentially and scan a part of the circuit corresponding to the column of the column processing circuit 218. The electrical signal of each of the columns of the pixels by column signal processed by the column processing circuit 218 may be output sequentially through the scan of the vertical selection circuit 216.

The support assembly 400 includes a support controller 410. The support controller 410 may be configured to control driving of the actuators of the first rotation member 401, the second rotation member 402, and the third rotation member 405 and maintain the body 100 at an expected posture.

The body 100 includes a body controller 110, an image processing circuit 120, and a storage device 130. The body controller 110 may be configured to control an operation of the body 100. The body controller 110 includes a determination circuit 112. When the camera 200 is mounted at the body 100, the determination circuit 112 may determine the type of the camera 200 or sensor 210. The determination circuit 112 may read recognition information, which may be used to recognize the type of the camera 200 or sensor 210, from the storage device 230 of the camera 200 and determine the type of the camera 200 and the sensor 210 based on the recognition information. The determination circuit 112 may further determine the predetermined arrangement of the sensor 210 as the type of the camera 200 or sensor 210. The recognition information may include model information that uniquely specifies the type of the image sensor. The recognition information may further include information specifying the image processing executed by the image processing circuit 120. The recognition information may further include information specifying the arrangement of the pixels composing the sensor 210.

Figure 4:
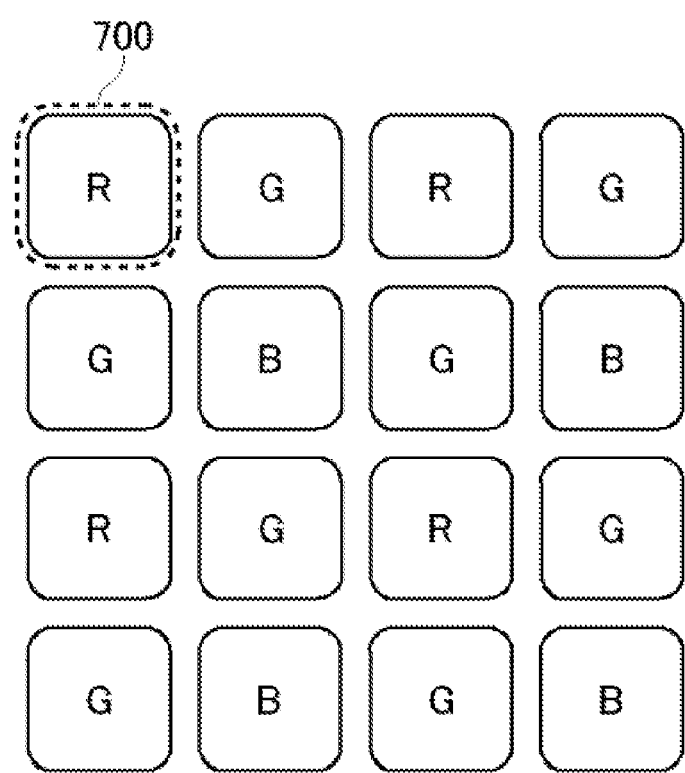
FIG. 4 is a schematic diagram showing a pixel arrangement according to some embodiments of the present disclosure.
Figure 5:
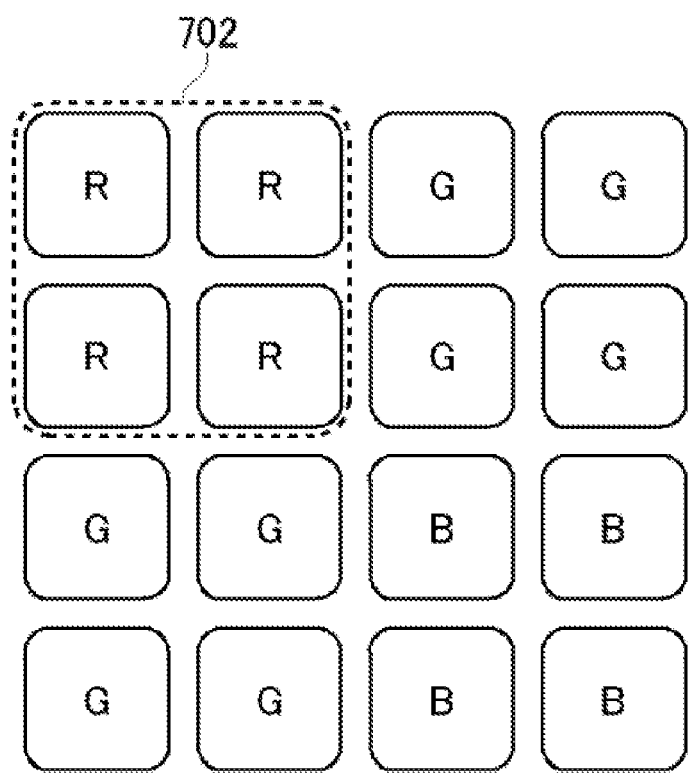
FIG. 5 is a schematic diagram showing another pixel arrangement according to some embodiments of the present disclosure.

For example, with color filters formed and arranged at various pixels according to different arrangements, the sensor 210 may function as different types of image sensors. For example, as shown in FIG. 4, the sensor 210 uses each pixel 700 of the pixels forming the pixel array 212 as a unit pixel and functions as an 8K image sensor with a Bayer arrangement. On the other hand, as shown in FIG. 5, the sensor 210 uses pixels having a same pixel structure, e.g., four pixels of 2×2, in the pixel array 212 as a unit pixel 702, and functions as a 4K image sensor with a Bayer arrangement. In addition, the sensor 210 may include an optical low pass filter. The optical low pass filter may be designed based on a pixel pitch of the pixel array 212. When four pixels of 2×2 are used as a unit pixel, the four pixels of 2×2 may be used as a pixel pitch to design the optical low pass filter.

Figure 6:
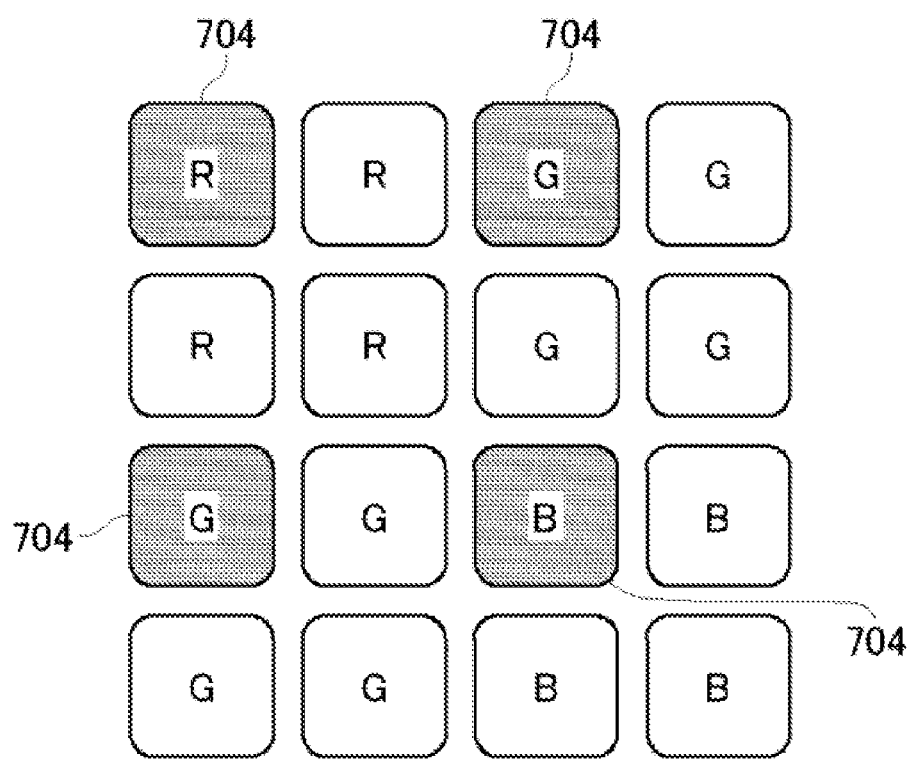
FIG. 6 is a schematic diagram showing another pixel arrangement according to some embodiments of the present disclosure.
Figure 7:
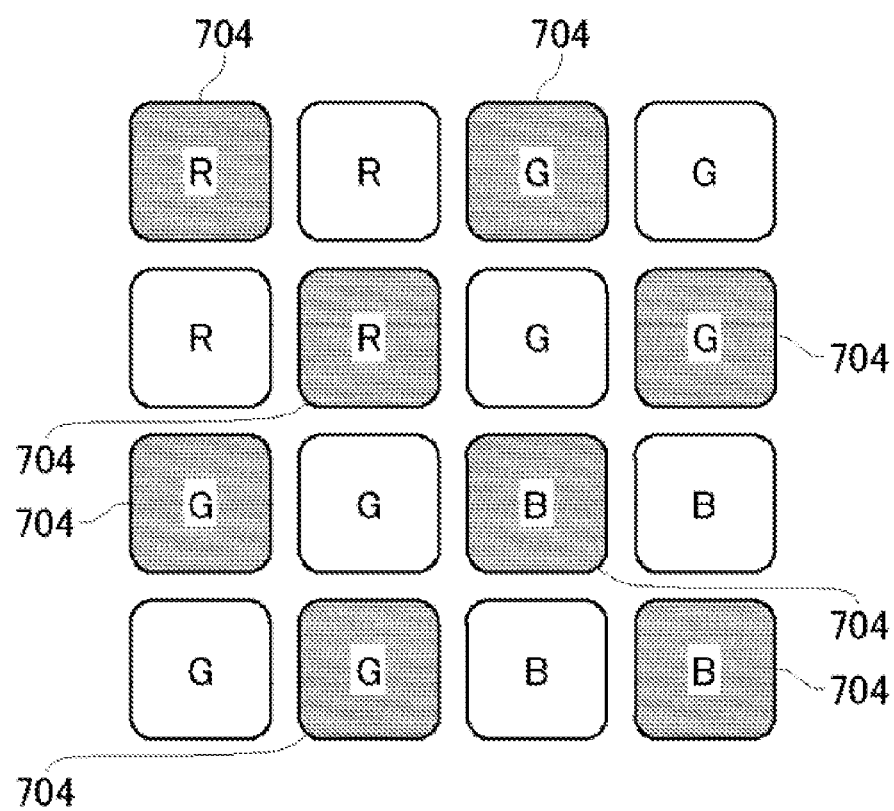
FIG. 7 is a schematic diagram showing another pixel arrangement according to some embodiments of the present disclosure.
Figure 8:
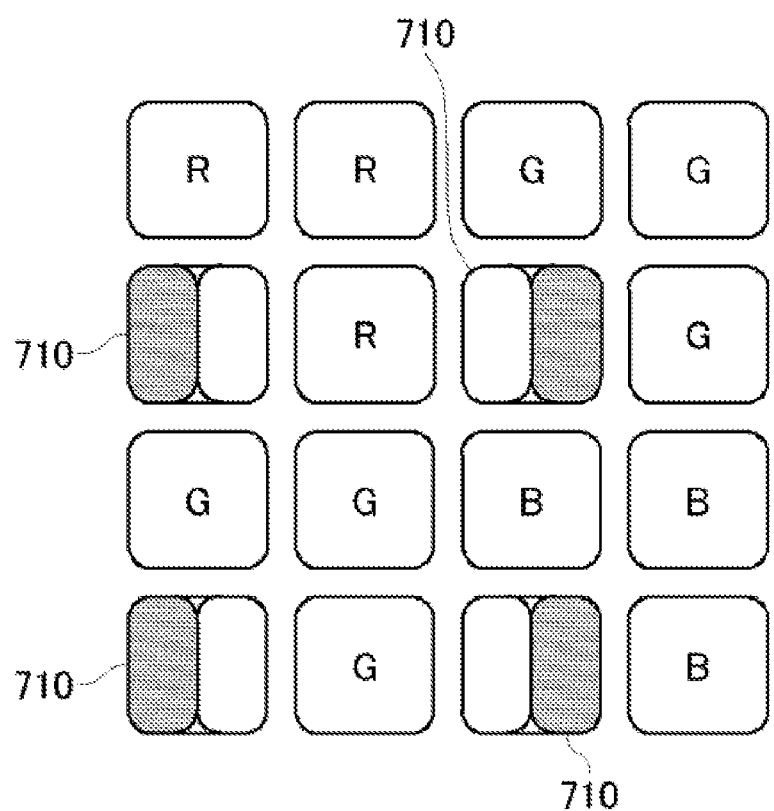
FIG. 8 is a schematic diagram showing another pixel arrangement according to some embodiments of the present disclosure.
Figure 9:
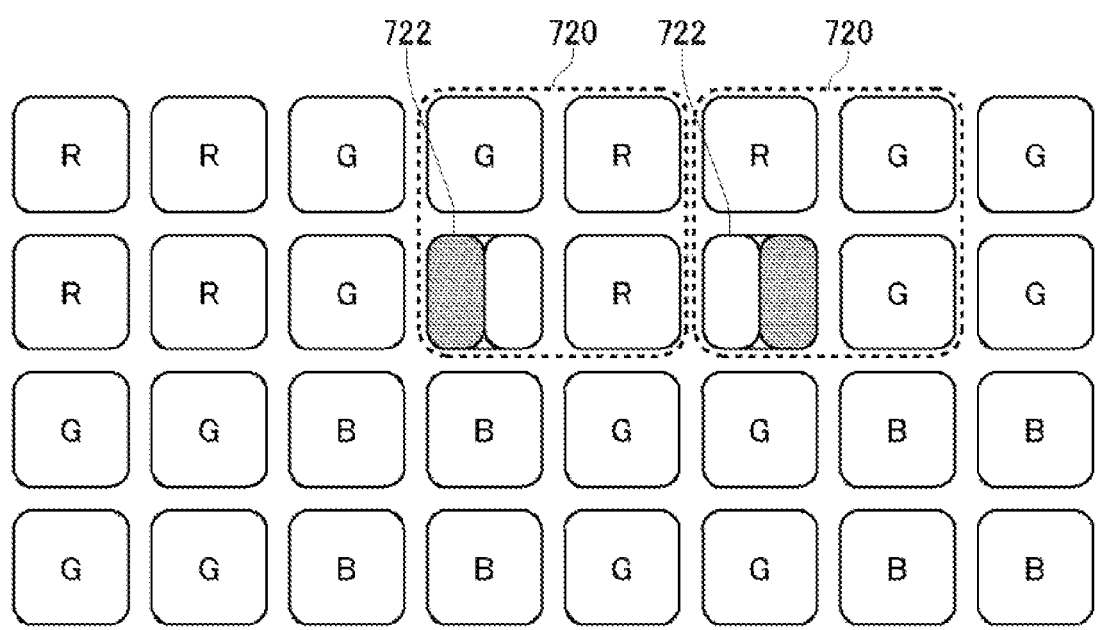
FIG. 9 is a schematic diagram showing another pixel arrangement according to some embodiments of the present disclosure.

As shown in FIG. 6, the sensor 210 functions as the 4K image sensor with a neutral density (ND) filter 704 arranged at a pixel of the four pixels of 2×2. As shown in FIG. 7, the sensor 210 functions as the 4K image sensor with ND filters 704 arranged at two pixels of the four pixels of 2×2. As shown in FIG. 8, the sensor 210 functions as the 4K image sensor with one pixel 710 of the four pixels of 2×2 functioning as one pixel of a pixel pair for image phase difference detection. As shown in FIG. 9, the sensor 210 functions as the 4K image sensor with a single pixel 722 of each of any two adjacent unit pixels 720 of the unit pixels, each including four pixels of 2×2, as one pixel of the pixel pair for the phase difference detection. In addition, a pixel for the phase difference detection may be arranged at a B component pixel or an R component pixel.

As such, even if the pixel array 212 may have the same pixel structure, since the filters arranged at the pixels are different, the sensor 210 may be configured to be an image sensor having different functions. Image processing may be performed on the electrical signal output by the sensor 210 in different manners according to different configurations of the unit pixel. The sensor 210 and the image processing circuit 120 may be in one unit. Therefore, the image processing circuit 120 performs the predetermined image processing corresponding to the structure of the unit pixel of the sensor 210. However, in some embodiments, the sensor 210 and the image processing circuit 120 may not be in one unit. In this scenario, the image processing circuit 120 needs to perform the image processing in different manners according to different types of the cameras 200 or sensors 210 connected to the body 100.

Therefore, the image processing circuit 120 may perform the predetermined image processing corresponding to the type of the camera 200 or sensor 210 on the electrical signal from the sensor 210. The sensor 210 may include a plurality of pixels arranged in a predetermined arrangement. The determination circuit 112 may further determine the predetermined arrangement of the sensor 210 as the type of the camera 200 or sensor 210. The image processing circuit 120 may perform the image processing corresponding to the predetermined arrangement on each output electrical signal of the plurality of pixels.

As described above, the sensor, for example, may include a first sensor (8K sensor) including the plurality of pixels arranged using one pixel as the unit pixel, or a second sensor (2×2 4K sensor) including the plurality of pixels arranged using four pixels of 2×2 as the unit pixel. In addition, when the sensor 210 connected to the camera 200 of the body 100 is the second sensor, the image processing circuit 120 may perform the image processing by adding a predetermined weight on the electrical signal output by each of the four pixels of 2×2.

The image processing circuit 120 includes a synthesis processing circuit 122, a switching circuit 214, and a demosaicing circuit 126. The switching circuit 124 may be configured to switch between inputting the electric signal output from the sensor section 210 to the synthesis processing circuit 122 or bypassing the synthesis processing circuit 122 according to the type of the camera 200 or the sensor 210.

When the sensor 210 is the second sensor, which includes the plurality of pixels arranged using four pixels of 2×2 as the unit pixel, the synthesis processing circuit 122 may average the electrical signals of the four pixels of 2×2 forming the unit pixel after summing the electrical signals of the four pixels of 2×2 forming the unit pixel, and output the result as an electric signal of one pixel. The image processing circuit 120 may be configured to store the electrical signal output from the synthesis processing circuit 122 as RAW data in the storage device 130. In addition, when the sensor 210 is the first sensor (8K sensor) including the plurality of pixels arranged using one pixel as the unit pixel, the image processing circuit 120 may store the electrical signal output from the sensor 210 as the RAW data in the storage device 130 directly without undergoing the processing by the synthesis processing circuit 122.

The demosaicing circuit 126 may be configured to perform demosaicing on the RAW data output from the sensor 210 or the RAW data output from the synthesis processing circuit 122. The image processing circuit 120 may store the data that is demosaiced by the demosaicing circuit 126, in an image format of JPEG, TIFF, etc., in the storage device 130.

When a defective pixel exists in the four pixels of 2×2 composing the unit pixel, the synthesis processing circuit 122 may use pixels of the four pixels other than the defective pixel to correct the electrical signal of the defective pixel, average the corrected electrical signals of the four pixels, and output the averaged electrical signal as an electrical signal of one pixel (this "one pixel" may refer to a unit pixel having multiple pixels (e.g., four pixels as described above) that functions as one pixel as a whole). When all of the four pixels are defective pixels, the synthesis processing circuit 122 may correct the electrical signals of the four pixels based on electrical signals of adjacent unit pixels, average the corrected electrical signals, and then output the averaged electrical signal as an electrical signal of one pixel.

The defective pixel can be a pixel that cannot output a normal electrical signal. The defective pixel can be a pixel that may generate an abnormal pixel signal for the amount of light received. The defective pixel, for example, may include a pixel of white deficiency or black deficiency. For example, an uniform lighting state may be formed at the pixel array 212 during manufacturing, a pixel that does not achieve an electrical signal of a predetermined level may be treated as a defective pixel, and position information (address information) of the defective pixel may be stored in the storage device 230. The synthesis processing circuit 122 may be configured to obtain the position information of the defective pixel from the storage device 230 to supplement the defective pixel.

When an electrical signal of a singular point (e.g., noise) exists in the electrical signals of the four pixels of the unit pixel, the synthesis processing circuit 122 may average the electrical signals of the remaining pixels and output the averaged electrical signal as an electrical signal of one pixel.

When a pixel of the four pixels forming the unit pixel is arranged with an ND filter, and the pixels without the ND filter are saturated, the synthesis processing circuit 122 may perform gain correction on the electrical signal of the pixel having the ND filter and output the corrected electrical signal as an electrical signal of one pixel.

When a pixel of the four pixels forming the unit pixel is arranged with the ND filter, and the pixels without the ND filter are not saturated, the synthesis processing circuit 122 may correct the electrical signal of the pixel having the ND filter, average the four electrical signals, and output the averaged electrical signal as an electrical signal of one pixel.

When a pixel of the four pixels forming the unit pixel is arranged with the ND filter, the pixel with the ND filter is a defective pixel, and the pixels without the ND filters are saturated, the electrical signals of the four pixels may be corrected based on the electrical signals of adjacent unit pixels, the corrected electrical signal may be averaged, and the average electrical signal may be output as an electrical signal of one pixel.

After multiplying the electrical signals of the four pixels forming the unit pixel by different gains, the synthesis processing circuit 122 may average the electrical signals of the four pixels and output the averaged electrical signal as an electrical signal of one pixel. As such, a dynamic range may be expanded, and noise may be reduced.

The sensor 210 may use the four pixels of 2×2 as the unit pixel without outputting an electrical signal of any one of the pixels. The sensor 210 may only drive one or two pixels of the four pixels and only output electrical signals of one or two pixels of each unit pixel. Thus, the synthesis processing circuit 122 may output an electrical signal of one pixel of each unit pixel or average the electrical signals of each unit pixel and the two pixels and output the average electrical signal as an electrical signal of one pixel. By reducing the number of pixels that need to be driven, the image processing may be implemented with high speed.

Figure 10:
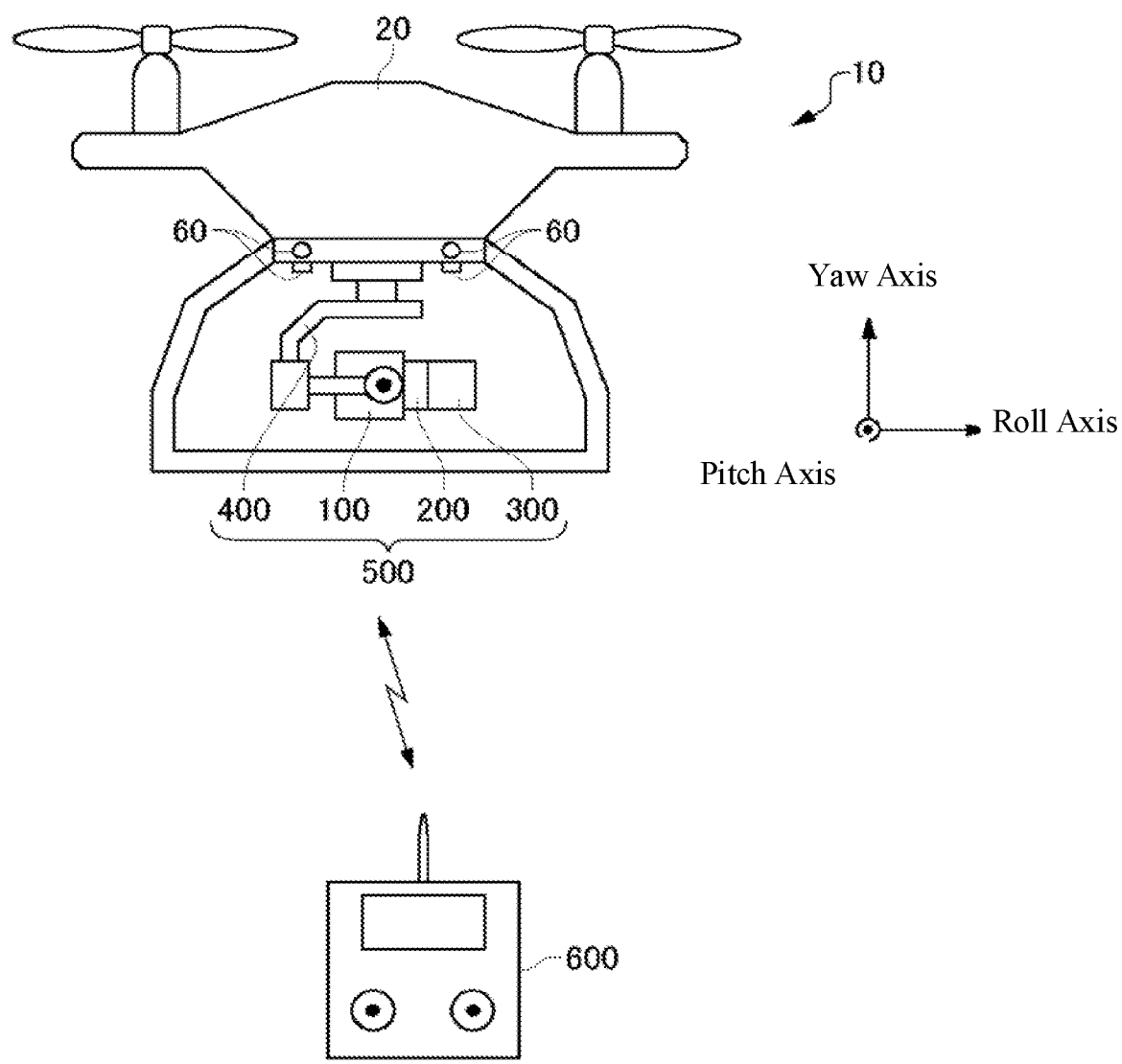
FIG. 10 is a schematic diagram showing an appearance of an unmanned aerial vehicle (UAV) and a remote controller according to some embodiments of the present disclosure.

The camera system 500 may be carried by a mobile body. As shown in FIG. 10, the camera system is carried by an unmanned aerial vehicle (UAV) 10. The UAV 10 includes a UAV body 20 and the camera system 500. The camera system 500 includes the support assembly 400, the body 100, the camera 200, and the lens unit 300. The UAV 10 is an example of a mobile body propelled by a propeller. The mobile body may include, besides the UAV, a concept of a flying body moving in the air, a vehicle moving on the ground, and a ship moving in the water.

The UAV body 20 includes a plurality of rotors. The plurality of rotors are an example of the propeller. The UAV body 20 may control the plurality of rotors to rotate to cause the UAV 10 to fly. The UAV 20 use, for example, four rotors to cause the UAV 10 to fly. The number of rotors is not limited to four. In addition, the UAV 10 may also be a fixed-wing aircraft without a rotor.

A plurality of cameras 60 are sensing cameras that may sense and photograph surrounding of the UAV 10 to control the flight of the UAV 10. Two of the cameras 60 may be arranged at a head, i.e., the front, of the UAV 10. The other two cameras 60 may be arranged at the bottom of the UAV 10. The two cameras at the front can be used in pair, which function as a stereo camera. The two camera devices at the bottom may also be used in pair, which function as a stereo camera. The UAV 10 can generate three-dimensional space data for the surrounding of the UAV 10 based on images captured by the plurality of cameras 60. A number of the cameras 60 of the UAV 10 is not limited to four. As long as the UAV 10 includes at least one camera 60. The UAV 10 may also have at least one camera 60 at each of the head, tail, each side, bottom, and top. An angle of view that can be set in the camera 60 may be larger than an angle of view that can be set in the camera system 500. The camera 60 may have a single focus lens or a fisheye lens.

A remote operation device 600 communicates with the UAV 10 to control the UAV 10 remotely. The remote operation device 600 may communicate with the UAV 10 wirelessly. The remote operation device 600 transmits to the UAV 10 instruction information indicating various commands related to the movement of the UAV 10 such as ascent, descent, acceleration, deceleration, forward, backward, rotation, etc. The instruction information includes, for example, instruction information to ascend the UAV 10. The instruction information may indicate a desired height of the UAV 10. The UAV 10 moves to the height indicated by the instruction information received from the remote operation device 600. The instruction information may include an ascent command to ascend the UAV 10. The UAV 10 ascends when receiving the ascent command. When the UAV 10 reaches an upper limit of the height, even the UAV 10 receives the ascent command, the UAV 10 may be limited to ascend.

The present disclosure is described above with embodiments of the present disclosure, but the technical scope of the present disclosure is not limited to the scope described in the above embodiments. For those skilled in the art, various changes or improvements may be made to the above-described embodiments. It is apparent that such changes or improvements are within the technical scope of the present disclosure.

The execution order of various processing such as actions, sequences, processes, and stages in the devices, systems, programs, and methods shown in the claims, the specifications, and the drawings, may be in any order, unless otherwise specifically indicated by "before," "in advance," etc., and as long as an output of previous processing is not used in subsequent processing. Operation procedures in the claims, the specifications, and the drawings are described using "first," "next," etc., for convenience. However, it does not mean that the operation procedures must be implemented in this order.

What is claimed is:

1. A camera system comprising:
a body including an image processing circuit and a determination circuit;
a support member configured to rotatably support the body; and
a camera configured to be detachably arranged at the body and including:
a holding member configured to detachably hold a lens; and
a sensor configured to convert an optical image formed by the lens into an electrical signal and including a plurality of pixels arranged in a predetermined arrangement;
wherein:
the determination circuit is configured to determine the predetermined arrangement of the sensor as a type of the camera or the sensor, wherein the predetermined arrangement of the sensor includes whether one pixel or multiple pixels are used as a unit pixel; and
the image processing circuit is configured to perform predetermined image processing corresponding to the predetermined arrangement on output electrical signals of the plurality of pixels.

2. The camera system of claim 1, wherein the camera includes a storage device configured to store RAW data being processed by the image processing circuit.

3. The camera system of claim 1, wherein:
the camera further includes a storage device configured to store recognition information used to recognize the type of the camera or the sensor; and
the determination circuit is further configured to determine the type of the camera or the sensor further based on the recognition information.

4. The camera system of claim 3, wherein the recognition information is a model information specifying the type of the camera or the sensor.

5. The camera system of claim 1, wherein the image processing circuit is configured to, in response to the determination circuit determining that the sensor is of a type that includes a plurality of pixels arranged with four pixels of 2×2 as a unit pixel, perform weighted average on the output electrical signals of the four pixels of 2×2.

6. A camera system comprising:
a body including:
a determination circuit; and
an image processing circuit; and
a camera configured to be detachably arranged at the body and including:
a sensor configured to convert an optical image into an electrical signal and including a plurality of pixels arranged in a predetermined arrangement; wherein:
the determination circuit is configured to determine the predetermined arrangement of the sensor as a type of the camera or the sensor, wherein the predetermined arrangement of the sensor includes whether one pixel or multiple pixels are used as a unit pixel; and
the image processing circuit is configured to perform predetermined image processing corresponding to the predetermined arrangement on output electrical signals of the plurality of pixels.

7. The camera system of claim 6, wherein the camera includes a storage device configured to store RAW data being processed by the image processing circuit.

8. The camera system of claim 6, wherein:
the camera further includes a storage device configured to store recognition information used to recognize the type of the camera or the sensor; and
the determination circuit is further configured to determine the type of the camera or the sensor further based on the recognition information.

9. The camera system of claim 8, wherein the recognition information is a model information specifying the type of the camera or the sensor.

10. The camera system of claim 6, wherein the image processing circuit is configured to, in response to the determination circuit determining that the sensor is of a type that includes a plurality of pixels arranged with four pixels of 2×2 as a unit pixel, perform weighted average on the output electrical signals of the four pixels of 2×2.

11. A mobile body comprising a camera system including:
a body including an image processing circuit and a determination circuit;
a support member configured to rotatably support the body; and
a camera configured to be detachably arranged at the body and including:
  a holding member configured to detachably hold a lens; and
  a sensor configured to convert an optical image formed by the lens into an electrical signal and including a plurality of pixels arranged in a predetermined arrangement; wherein:
the determination circuit is configured to determine the predetermined arrangement of the sensor as a type of the camera or the sensor, wherein the predetermined arrangement of the sensor includes whether one pixel or multiple pixels are used as a unit pixel; and
the image processing circuit is configured to perform predetermined image processing corresponding to the predetermined arrangement on output electrical signals of the plurality of pixels.

12. The mobile body of claim 11, wherein the camera includes a storage device configured to store RAW data being processed by the image processing circuit.

13. The mobile body of claim 11, wherein:
the camera further includes a storage device configured to store recognition information used to recognize the type of the camera or the sensor; and
the determination circuit is further configured to determine the type of the camera or the sensor further based on the recognition information.

14. The mobile body of claim 13, wherein the recognition information is a model information specifying the type of the camera or the sensor.

15. The mobile body of claim 11, wherein the image processing circuit is configured to, in response to the determination circuit determining that the sensor is of a type that includes a plurality of pixels arranged with four pixels of 2×2 as a unit pixel, perform weighted average on the output electrical signals of the four pixels of 2×2.

* * * * *